United States Patent
Duepree

[15] 3,653,735
[45] Apr. 4, 1972

[54] MOLDED DRAWER GUIDES

[72] Inventor: Hans-Werner Duepree, Avenwedde, Germany

[73] Assignee: Elco Kunststoffe A. Elges & Co., Avenwedde, Germany

[22] Filed: Sept. 26, 1969

[21] Appl. No.: 861,414

[30] Foreign Application Priority Data

Oct. 3, 1968  Germany..........................G 68 00 639

[52] U.S. Cl............................................................312/330
[51] Int. Cl. .........................................................A47b 88/00
[58] Field of Search..................312/330, 343, 345, 346, 263; 220/4

[56] References Cited

UNITED STATES PATENTS

| | | | |
|---|---|---|---|
| 1,301,495 | 4/1919 | Otte | 312/338 X |
| 2,418,244 | 4/1947 | Baird | 312/343 |
| 2,701,174 | 2/1955 | Franks | 312/345 X |
| 3,160,448 | 12/1964 | Abernathy et al. | 312/346 X |
| 3,315,834 | 4/1967 | Nemlich | 220/4 |
| 3,462,208 | 8/1969 | Black et al. | 312/330 X |

FOREIGN PATENTS OR APPLICATIONS

| | | | |
|---|---|---|---|
| 815,935 | 6/1969 | Canada | 312/263 |
| 1,085,624 | 10/1967 | England | 312/330 |

Primary Examiner—Patrick D. Lawson
Assistant Examiner—George H. Krizmanich
Attorney—McClure, Weiser & Millman

[57] ABSTRACT

Furniture drawers produced by injection molding are provided with various edge guides and combinations thereof for greater rigidity and smoother operation.

4 Claims, 12 Drawing Figures

PATENTED APR 4 1972

3,653,735

Inventor:
HANS-WERNER DUEPREE
By McGlew, Weiser + Millman
Attorneys.

MOLDED DRAWER GUIDES

This invention relates to furniture drawers, especially those made by injection molding of plastic compositions, and concerns particularly the edge guides thereof.

Conventional furniture drawers have extending outwardly therefrom in ledge form at or near the top of each exterior side edge at least one guide extending from front to rear along such side edge. Each such guide fits slidably in a cooperating guideway in a surrounding part of the furniture, and the drawer is supported as well as guided thereby to achieve normally acceptable operation. However, such drawers may become twisted or warped, whereupon distortion of the sidewalls and the guides is conducive to jamming of the drawers during attempts to withdraw and reinsert them. The problem is especially troublesome when the drawers are loaded unevenly, i.e., more heavily on one side than the other, and when they are pulled out askew.

A primary object of the present invention is enhanced structural stability of molded drawers and guides thereof.

A further object is achievement of such stability by simple redesign of drawer guide configuration at little additional cost of injection molds and related equipment for forming such drawers and guides.

Other objects of this invention, together with means and methods for attaining the various objects, will be apparent from the following description and the accompanying diagrams of various embodiments, which are shown by way of example rather than limitation.

Figure 2:
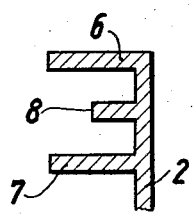
FIG. 2 is a transverse sectional elevation through a first embodiment of drawer guide, and adjacent part of the drawer sidewall, according to this invention.
Figure 10:
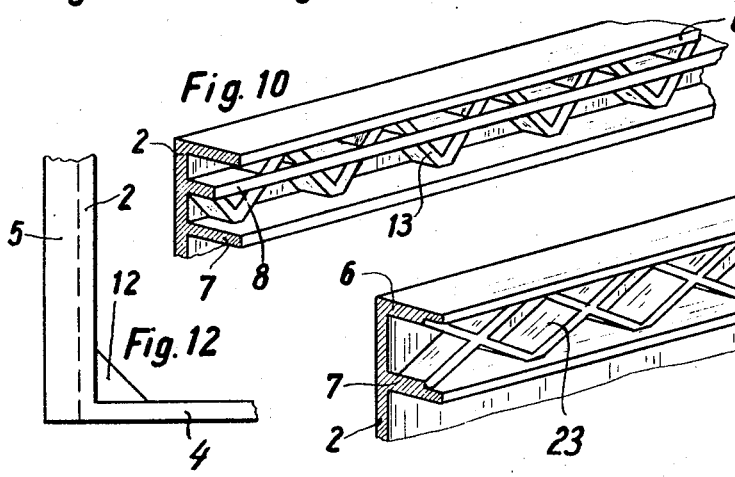
Figure 12:
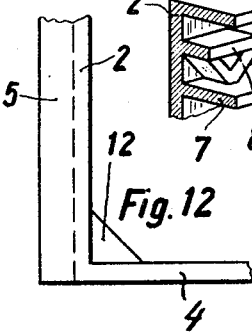
Figure 11:
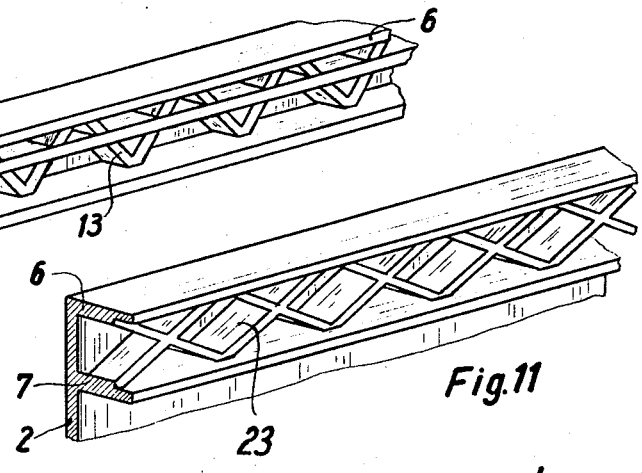

FIGS. 3 to 9, inclusive, are views similar to that of FIG. 2 but showing additional drawer guide embodiments of the invention;

FIG. 10 is a perspective view of yet another embodiment;

FIG. 11 is a view similar to that of FIG. 10 but showing a further embodiment; and FIG. 12 is a fragmentary plan of a drawer showing an auxiliary feature useful in drawers of this invention.

In general, the objects of this invention are accomplished, in an injection molded drawer of plastic composition, by at least one reinforcement guide portion extending parallel to such ledge-like guide. Such reinforcement may take the form of a step or shoulder (viewed in transverse section) near the junction thereof with the sidewall, an upturn or a downturn at the outer edge, or a combination of such offsets so as to produce a groove in one of the horizontal surfaces of that otherwise ledge-like guide or in one or more added reinforcing guides. Additionally or alternatively one or more ledge-like guides may be supplied for like purpose. Also, inclined bracing ribs may interconnect portions of the facing horizontal surfaces of plural guides. Auxiliary reinforcement in corners of the drawers is optionally provided by beveled inserts, extending vertically or horizontally (or both).

In the diagrams, like parts are designated by the same reference numeral throughout, and analogous or corresponding parts have reference numerals differing by 10 or a multiple thereof.

Figure 1:
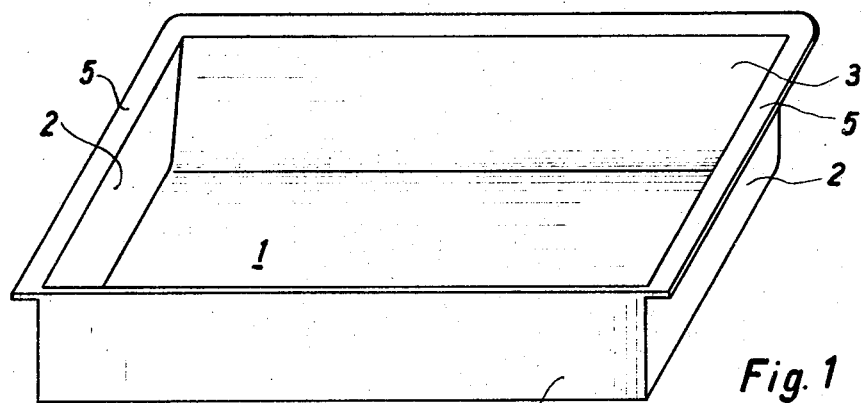
FIG. 1 is a perspective view of a drawer to which the present invention is applicable.

FIG. 1 shows in perspective a furniture drawer having bottom 1, vertical right and left sidewalls 2, vertical or oblique rear wall 3, and front wall 4. Not shown is a facing piece such as is customarily attached to the front wall, as by gluing or by insertion of screws or pegs into cooperating openings (also not shown) therein, for finishing the front of the drawer or matching it in appearance to other furniture. Ledge-like guides 5 extend outwardly from the top edge of sidewalls 2 (also rear wall 3). FIG. 1 may be deemed to show a conventional drawer adapted to be modified according to this invention, such as indicated in a subsequent view.

FIG. 2 shows in fragmentary sectional elevation a left sidewall portion with plural guides thereon according to this invention. Upper horizontally extending guide 6 and lower horizontally extending guide 7 of like outward extent or full width are spaced above and below partial-width intermediate guide 8 on sidewall 2, in a generally E-shaped configuration (reversed or backwards because this is the left, rather than the right, side). These multiple guides, fitting in complementarily shaped guideways (not shown) improve the rigidity and the guiding of the drawer.

Figure 3:
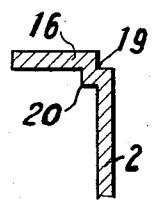

FIG. 3 shows similarly such a sidewall portion with only single guide 16 offset at its junction to sidewall 2 by instep 19 as viewed from above and inside drawer, evident as shoulder 20 as viewed from the outside and below the guide. Despite the lack of a separate added guide, this offset guide construction cooperates with a complementary guideway (not shown) to improve the performance over that provided by a simple ledge-like guide.

Figure 4:
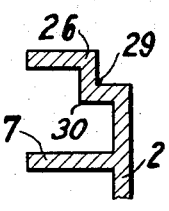

FIG. 4 shows similarly a double-guide embodiment in which sidewall 2 (shown in part) is provided with both offset upper guide 26, which differs from offset guide 16 of FIG. 3 by larger instep 29 and shoulder 30, and lower full-width guide 7. Of course, the guideways (not shown) are configured accordingly. This embodiment has advantages of both previous constructions to at least some extent.

Figure 5:
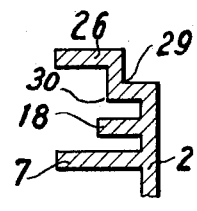

FIG. 5 shows similarly a triple-guide embodiment having upper and lower guides as in FIG. 4 but with partial-width guide 18 interposed therebetween. The resulting structure is similar to that of FIG. 2 except for substitution of offset guide 26 in place of straight upper guide 6 thereof and resulting closer guide spacing.

Figure 6:
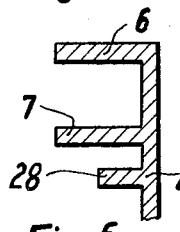

FIG. 6 shows similarly another triple-guide embodiment, which is like that of FIG. 2 except that partial-width guide 28 is located below lower guide 7 rather than in an intermediate position thereabove such as is partial-width guide 8 in that previous embodiment.

Figure 7:
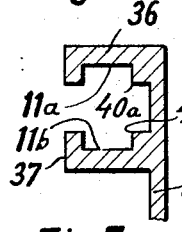

FIG. 7 shows similarly a double-guide embodiment having thick upper and lower guides 36 and 37 with their adjacent horizontal surfaces widely grooved longitudinally by channels 11a and 11b, respectively, between downturned and upturned outer edges of the upper and lower guides, respectively, and inner shoulders 40a and 40b. Corresponding offset configuration of guideways (not shown) therefor will be apparent. The shoulders and the offset edges permitted by the added thickness augments the rigidity of each guide without excessive consumption of component plastic material.

Figure 8:
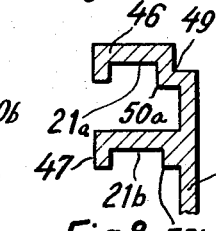

FIG. 8 shows similarly a double-guide embodiment having upper guide 46 like upper guide 36 of the last preceding view except for instep 49 (similar to instep 29 of FIGS. 4 and 5) adjacent the sidewall opposite shoulder 50a, the channel in its lower face being designated 21a. Lower guide 47 is like lower guide 37 of that preceding view but inverted, having channel 21b in its lower face bounded at its inner end by shoulder 50b and at its outer end by the downturned edge of the guide.

Figure 9:
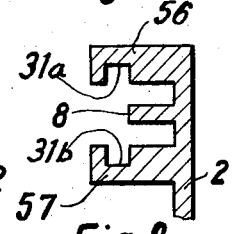

FIG. 9 shows similarly a triple-guide embodiment like that of FIG. 7 but with intermediate partial-width guide 8 interposed therebetween and with the adjacent faces of upper and lower guides 56 and 57 narrowly grooved longitudinally in slots 31a and 31b, respectively, in place of the wide channels previously shown. The resultant configuration may be considered stylized E shape. Of course, as with each of the other configuration, the guideways (not shown) of the complementary part of the furniture are configured accordingly to receive preferably all the faces of the guides slidably thereagainst.

It will be apparent from the foregoing description that the basic features of reinforcement according to this invention (i.e., one or more additional parallel guides, an offset step, shoulder, or groove configuration of guide) may be combined in quite diverse and almost arbitrary manner, to attain the desired objectives. Experimentation has shown that combination of any two of these features greatly increases the drawer rigidity. The improvement is normally greater when three or more examples thereof are combined, as in certain of the diagrams or other combinations thereof. Naturally it is expedient to provide such modification, especially a step construction, of rear wall 3, as well as of sidewalls 2, of the drawer.

A substantial further improvement in rigidity is attainable by interconnecting a plurality of guides by inclined bracing ribs, as exemplified in the next two views.

FIG. 10 shows in perspective a triple-guide structure like that of FIG. 2 to which has been added more or less sinusoidal bracing ribs 13 which extend obliquely along a continuing junction with the sidewall from the adjacent face of one full-width guide to the other as though passing through the intermediate partial-width guide at the inflection point. Actually, the ribs are substantially straight and, of course, attach to the faces of the partial-width guide as well as to the adjacent faces of the upper and lower guides.

FIG. 11 shows similarly a simple double-guide structure like the triple-guide structure of FIG. 2 less the intermediate guide and with addition of two interleaving sets of bracing ribs 23, one set being like the ribs of FIG. 10 and the other set being identical but displaced by a half cycle so that its maximum (junction with the under face of upper guide 6) is directly above the other set's minimum (junction with the visible surface of lower guide 7).

These last two modifications provide extraordinary increases in rigidity with comparatively small addition of component material. Both these and the various guide configurations can be produced, when using the injection molding technique, by means of so-called slide plates in the molds. This permits multiple modifications of drawer guide structures at relatively low cost using only one basic mold. Different reinforcement may be used for the rear wall of such a drawer than for the sidewalls thereof, even when such bracing ribs are employed (preferably with an intermediate partial-width guide).

FIG. 12 shows in fragmentary plan a further useful reinforcement of a plastic drawer, especially for the benefit of thin front wall 4, which is kept thin to accommodate a wooded or other overlying finishing piece. Beveled insert 12 fits horizontally into the corner between front wall 4 and sidewall 2 (one visible). Of course, a like stiffening insert can be added at other corners, as well, such as perpendicularly at the junction of the front wall and the bottom.

Notwithstanding the foregoing examples for practicing this invention certain modifications have been suggested, and others will be apparent, that provide some or all of the benefits of the invention without departing from the inventive concept. The invention itself is defined in the following claims.

I claim:

1. In a drawer formable of a suitable plastic material by injection molding having a front wall, a rear wall and a pair of parallel sidewalls connected to said front and rear walls, said sidewalls each having an outer side as well as a front end and a rear end and comprising:

each of the sidewalls having an upper and a lower guide on its outer side each parallel to the other and each extending substantially from the front end to the rear end of its respective sidewall, each of the upper guides having an under face and each of the lower guides having an upper face, each of the sidewalls having a plurality of inclined bracing ribs extending respectively between the under face of the upper guide of that sidewall and the upper face of the lower guide thereof.

2. In a drawer according to claim 1 each of the sidewalls having an intermediate guide positioned respectively between the upper and the lower guide of that sidewall, each of the intermediate guides intersected respectively by the bracing ribs of its sidewall.

3. In a drawer according to claim 1, the bracing ribs of each sidewall extending generally sinusoidally between the under and the upper faces of that sidewall.

4. In the drawer according to claim 3 each of the sidewalls having two sets of bracing ribs offset one-half cycle with respect to one another so that the respective sets of bracing ribs of each of the sidewalls engage the under and upper faces of that sidewall vertically above and below one another.

* * * * *